(12) United States Patent
Park et al.

(10) Patent No.: US 10,895,073 B2
(45) Date of Patent: Jan. 19, 2021

(54) VIBRATION-SHOCK ENERGY ABSORPTION DEVICE USING COMPOSITE TUBE, AND BUILDING VIBRATION CONTROL DEVICE USING SAME

(71) Applicant: KOREA AEROSPACE RESEARCH INSTITUTE, Daejeon (KR)

(72) Inventors: Ill Kyung Park, Daejeon (KR); Sung Joon Kim, Daejeon (KR); Tae Uk Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 16/622,546

(22) PCT Filed: Sep. 28, 2017

(86) PCT No.: PCT/KR2017/010798
§ 371 (c)(1),
(2) Date: Dec. 13, 2019

(87) PCT Pub. No.: WO2018/230774
PCT Pub. Date: Dec. 20, 2018

(65) Prior Publication Data
US 2020/0340243 A1    Oct. 29, 2020

(30) Foreign Application Priority Data

Jun. 15, 2017    (KR) .................. 10-2017-0076048

(51) Int. Cl.
*E04B 1/98* (2006.01)
*F16F 15/02* (2006.01)
(Continued)

(52) U.S. Cl.
CPC ............... *E04B 1/98* (2013.01); *E04H 9/02* (2013.01); *F16F 13/005* (2013.01); *F16F 15/022* (2013.01)

(58) Field of Classification Search
CPC .. E04B 1/98; E04H 9/02; E04H 9/021; E04H 9/0215; E04H 9/028; E04H 9/024;
(Continued)

(56) References Cited

U.S. PATENT DOCUMENTS 2,229,442 A * 1/1941 Clark ................ B61G 9/10
213/32 R
2,574,788 A * 11/1951 Janeway ............. B61F 5/125
267/209
(Continued)

FOREIGN PATENT DOCUMENTS

JP    H11-247913 A    9/1999
JP    2007-120170 A    5/2007
(Continued)

*Primary Examiner* — Theodore V Adamos
(74) *Attorney, Agent, or Firm* — Rabin & Berdo, P.C.

(57) ABSTRACT

The present invention provides a device configured to effectively absorb repeated shock energy such as a vibration shock by using a composite tube, and the present invention has advantageous effects in that the shock energy caused by a tensile or compressive shock load may be effectively absorbed by the composite tube, and the shock energy absorption device may be applied to a building and used as a vibration control device capable of preparing for repeated earthquakes.

18 Claims, 10 Drawing Sheets

(51) Int. Cl.
*F16F 13/00* (2006.01)
*E04H 9/02* (2006.01)

(58) Field of Classification Search
CPC ...... F16F 13/005; F16F 15/022; F16F 15/023; F16F 15/067; F16F 7/12
See application file for complete search history.

(56) References Cited

U.S. PATENT DOCUMENTS

| | | | | |
|---|---|---|---|---|
| 2,747,696 | A | * | 5/1956 | Blattner ................ B61F 5/122 188/129 |
| 2,844,366 | A | * | 7/1958 | Butterfield ............... F16F 7/09 267/134 |
| 3,140,080 | A | * | 7/1964 | Rumsey ................. B61G 9/18 267/134 |
| 4,736,931 | A | * | 4/1988 | Christopherson .... B60G 15/063 188/322.19 |
| 4,955,467 | A | * | 9/1990 | Kallenbach ............... F16F 7/09 188/134 |
| 6,702,266 | B1 | * | 3/2004 | Dec ........................... F16F 7/08 267/202 |
| 2003/0051956 | A1 | * | 3/2003 | Serkh ....................... F16F 7/08 188/322.14 |
| 2013/0207326 | A1 | * | 8/2013 | Cotter ..................... F16F 9/585 267/119 |
| 2014/0097563 | A1 | * | 4/2014 | Hewitt .................. F16F 13/005 267/140.13 |

FOREIGN PATENT DOCUMENTS

| | | |
|---|---|---|
| KR | 10-2007-0078841 A | 8/2007 |
| KR | 10-1034789 B1 | 5/2011 |
| KR | 10-1051058 B1 | 7/2011 |
| KR | 10-1140160 B1 | 5/2012 |
| KR | 10-1278136 B1 | 6/2013 |
| KR | 10-1332602 B1 | 11/2013 |

\* cited by examiner

FIG. 1

- PRIOR ART -

① Initial state (Not loading)   ② 1st contraction   ③ Neutral position after 1st contraction   ④ 1st extension   ⑤ Neutral position after 1st extension

FIG. 7

VIBRATION-SHOCK ENERGY ABSORPTION DEVICE USING COMPOSITE TUBE, AND BUILDING VIBRATION CONTROL DEVICE USING SAME

TECHNICAL FIELD

The present invention relates to an energy absorption device using a composite tube configured to absorb energy caused by repeated shock loads, and to a building vibration control device using the energy absorption device.

BACKGROUND ART

Methods of designing vibration resistance in the related art may be broadly classified into two methods including a method of increasing strength and a method of increasing ductility. Because the method of designing vibration resistance by increasing strength uses an excessively large member, the method is not economical and may cause great human casualties due to sudden brittle fractures of structures. In addition, the method of designing vibration resistance by increasing ductility may effectively reduce a magnitude of an earthquake load by absorbing earthquake energy by plastically deforming structural members, but the method has a drawback in that it is difficult to perform maintenance/reinforcement after the earthquake and a lot of installation costs is required.

On the other hand, a vibration control technology protects a structure by concentrating vibrational energy introduced into the structure on an additional vibration control device. Therefore, the vibration control technology prevents or minimizes the plastic deformation of the structure itself even though the vibration control technology incurs initial costs similar to or slightly larger than costs of general vibration resistance structures. Therefore, the vibration control technology may easily perform maintenance/reinforcement after the earthquake and may effectively block and reduce ground vibration to be transmitted to the structure, thereby exhibiting an excellent performance in protecting various personnel and goods accommodated inside. The vibration control technology has begun to be applied mainly to important facilities such as bridges, hospitals, and nuclear power plants in earthquake-prone areas and its application tends to widely expand since the vibration control technology has been proven as being excellent in the actual earthquake.

As a related art related to the vibration control technology, there is Korean Patent No. 10-1278136 entitled "Vibration isolation apparatus of building".

Further, shock energy absorption devices using compressive fractures (or deformation) of metallic or composite tubes are used as collision energy absorption devices for automobiles, railway vehicles, aircraft seats, and the like. The shock energy absorption device using the compressive fracture of the tube has high collision energy absorption characteristics and has advantages such as simplicity and low costs in comparison with hydraulic or pneumatic energy absorption devices and viscoelastic energy absorption devices.

Figure 1:
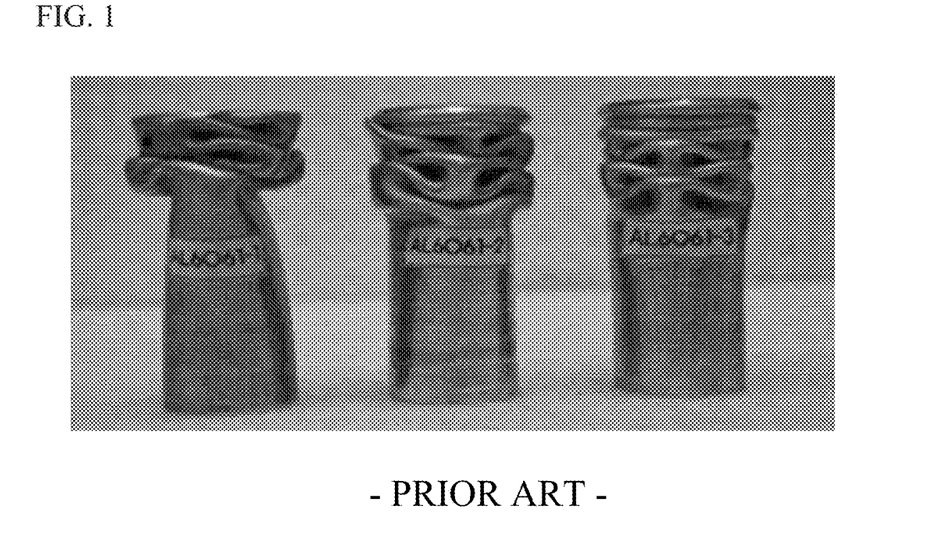
FIG. 1 is a view illustrating an example of a shock absorption device made of metal.

In particular, the collision energy absorption device using the composite tube has a higher absorbency per weight than the device using the metallic tube. FIG. 1 illustrates that a metallic tube has a plastically deformed portion after absorbing a compressive shock. However, unlike the metallic tube, the composite tube does not have a plastically deformed portion, and a portion fractured by a shock is simple, such that the composite tube may achieve an effective energy absorption device.

However, the method of absorbing energy by compressing and fracturing the tube in the related art is applicable only to a unidirectional, one-off collision condition. For this reason, this method cannot be applied to a device that absorbs energy of a large shock (collision) load that changes or repeats a load direction.

DISCLOSURE

Technical Problem

An object of the present invention is to provide a device configured to effectively absorb repeated shock energy such as a vibration shock by using a composite tube.

Further, an object of the present invention is to provide a vibration control device in which the shock energy absorption device is applied to a building, thereby preparing for repeated earthquakes.

Technical Solution

The present invention provides a repeated shock energy absorption device including an inner cylinder having a cylindrical first member having therein a hollow portion, an outer cylinder having a second member having therein a hollow portion configured to accommodate the first member, a compressive wedge provided to adjoin an outer circumferential surface of the second member of the outer cylinder, a compressive slider provided to be in contact with an outer surface of the compressive wedge, and a first composite tube and an outer spring configured to adjoin one side surface and the other side surface of the compressive slider, respectively, in which a slider inclined surface is formed inside the compressive slider, and a wedge inclined surface is formed outside the compressive wedge, such that the slider inclined surface and the wedge inclined surface adjoin each other.

The repeated shock energy absorption device further includes a first support end protruding outward from the inner cylinder and configured to support the first composite tube, and a second support end protruding outward from the outer cylinder and configured to support the outer spring.

The wedge inclined surface of the compressive wedge is formed such that a thickness of the compressive wedge is increased in a direction from the inner cylinder to the outer cylinder.

When a compressive shock load occurs between the inner cylinder and the outer cylinder, the slider inclined surface of the compressive slider applies a perpendicular force to the wedge inclined surface of the compressive wedge, such that an inner circumferential surface of the compressive wedge and the outer circumferential surface of the second member of the outer cylinder are tightly attached to each other, and the compressive wedge and the outer cylinder are integrally moved.

Only a part of the first composite tube in a longitudinal direction is fractured to absorb shock energy.

When a compressive shock load between the inner cylinder and the outer cylinder is eliminated, an inner circumferential surface of the compressive wedge and the outer circumferential surface of the second member of the outer cylinder are separated from each other, such that the compressive wedge and the outer cylinder are movable relative to each other.

The present invention also provides a repeated shock energy absorption device including an inner cylinder having a cylindrical first member having therein a hollow portion, an end plug having a center pin disposed in the hollow portion in the first member of the inner cylinder, a tensile wedge provided to adjoin an inner circumferential surface of the first member of the inner cylinder, a tensile slider provided to be in contact with an inner surface of the tensile wedge and a second composite tube and an inner spring configured to adjoin one side surface and the other side surface of the tensile slider, respectively, in which a slider inclined surface is formed outside the tensile slider, and a wedge inclined surface is formed inside the tensile wedge, such that the slider inclined surface and the wedge inclined surface adjoin each other.

The repeated shock energy absorption device may further include a protruding end protruding outward from an end of the center pin and configured to support the second composite tube, and a spring support end formed on the end plug and configured to support the inner spring.

The wedge inclined surface of the tensile wedge is formed such that a thickness of the tensile wedge is increased in a direction from the inner cylinder to the end plug.

When a tensile shock load occurs between the inner cylinder and the end plug, the slider inclined surface of the tensile slider applies a perpendicular force to the wedge inclined surface of the tensile wedge, such that an outer circumferential surface of the tensile wedge and the inner circumferential surface of the first member of the inner cylinder are tightly attached to each other, and the tensile wedge and the inner cylinder are integrally moved.

Only a part of the second composite tube in a longitudinal direction is fractured to absorb shock energy.

When a tensile shock load between the inner cylinder and the end plug is eliminated, an outer circumferential surface of the tensile wedge and the inner circumferential surface of the first member of the inner cylinder are separated from each other, such that the tensile wedge and the inner cylinder are movable relative to each other.

The present invention also provides a repeated compressive/tensile shock energy absorption device including an inner cylinder having a cylindrical first member having therein a hollow portion, an outer cylinder having a second member having therein a hollow portion configured to accommodate the first member, an end plug having a center pin that penetrates the hollow portion in the second member and has an end disposed in the hollow portion in the first member, a compressive wedge provided to adjoin an outer circumferential surface of the second member of the outer cylinder, a compressive slider provided to be in contact with an outer surface of the compressive wedge, a first composite tube and an outer spring configured to adjoin one side surface and the other side surface of the compressive slider, respectively, a tensile wedge provided to adjoin an inner circumferential surface of the first member of the inner cylinder, a tensile slider provided to be in contact with an inner surface of the compressive wedge, and a second composite tube and an inner spring configured to adjoin one side surface and the other side surface of the tensile slider, respectively.

A slider inclined surface is formed inside the compressive slider and a wedge inclined surface is formed outside the compressive wedge such that the slider inclined surface and the wedge inclined surface adjoin each other, and a slider inclined surface is formed outside the tensile slider and a wedge inclined surface is formed inside the tensile wedge such that the slider inclined surface and the wedge inclined surface adjoin each other.

When a compressive shock load occurs, the slider inclined surface of the compressive slider applies a perpendicular force to the wedge inclined surface of the compressive wedge such that an inner circumferential surface of the compressive wedge and the outer circumferential surface of the second member of the outer cylinder are tightly attached to each other and the compressive wedge and the outer cylinder are integrally moved, and when a tensile shock load occurs, the slider inclined surface of the tensile slider applies a perpendicular force to the wedge inclined surface of the tensile wedge such that an outer circumferential surface of the tensile wedge and the inner circumferential surface of the first member of the inner cylinder are tightly attached to each other and the tensile wedge and the inner cylinder are integrally moved.

The present invention also provides a building vibration control device including the vibration-shock energy absorption device using the composite tube.

Effect

The present invention has advantageous effects in that the shock energy caused by the tensile or compressive shock load may be effectively absorbed by the composite tube, and the shock energy absorption device may be applied to a building and used as a vibration control device capable of preparing for repeated earthquakes.

DESCRIPTION OF DRAWINGS

FIGS. 5A to 5/ are views illustrating a configuration in which a tensile shock is absorbed by some components of the vibration-shock energy absorption device using the composite tube according to the present invention.

BEST MODE

Other objects, particular advantages, and novel features of the present invention will be more clearly understood from the following detailed description and the exemplary embodiments with reference to the accompanying drawings. In addition, the terms used herein are defined considering the functions in the present invention and may vary depending on the intention or usual practice of a user or an operator. Therefore, the definition of the terms should be made based on the entire contents of the technology of the present invention.

Figure 2:
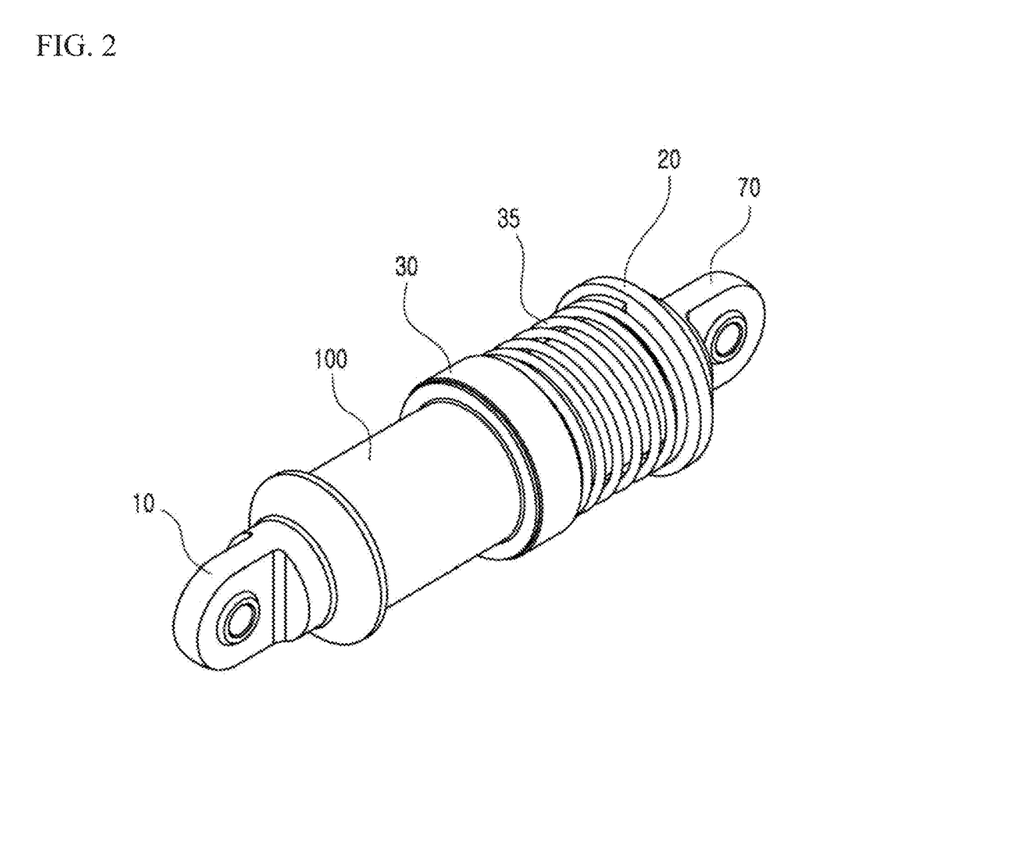
FIG. 2 is a perspective view of a vibration-shock energy absorption device using a composite tube according to the present invention.
Figure 3A:
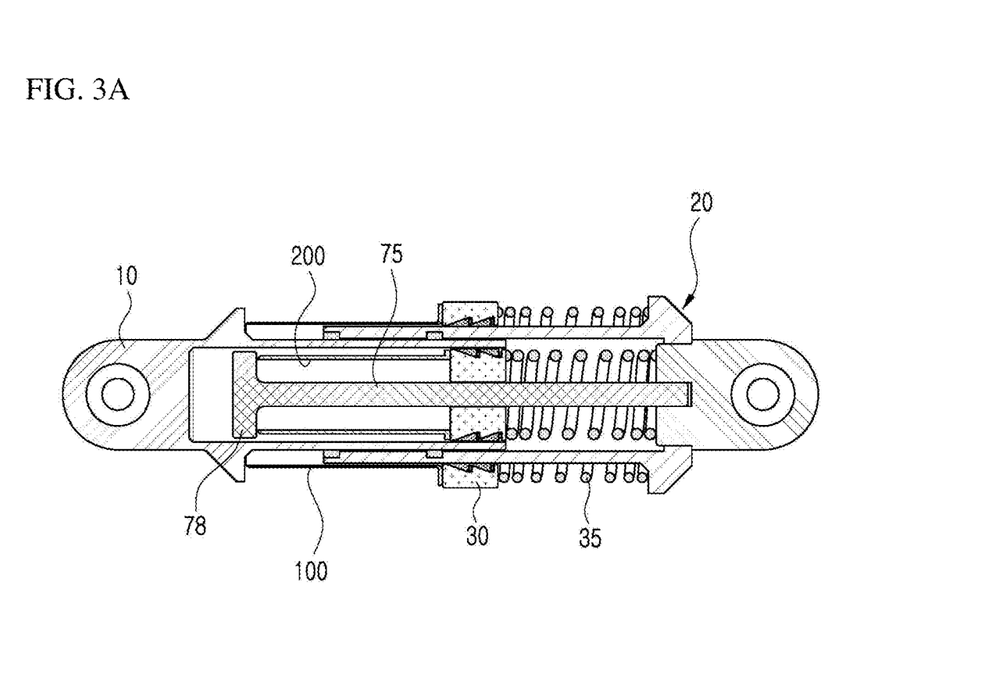
FIG. 3A is a cross-sectional view of the vibration-shock energy absorption device using the composite tube according to the present invention.
Figure 3B:
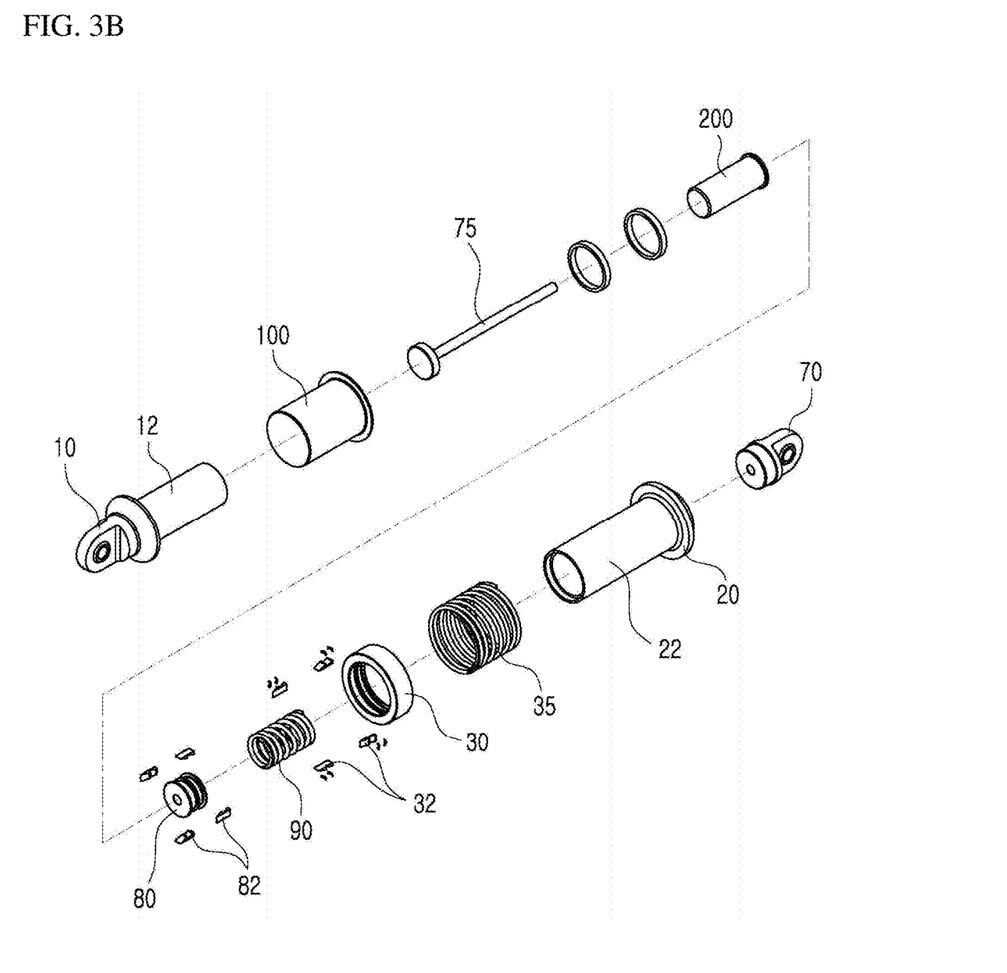
FIG. 3B is an exploded perspective view of the vibration-shock energy absorption device using the composite tube according to the present invention.

FIG. 2 is a perspective view of a vibration-shock energy absorption device using a composite tube according to the present invention, FIG. 3A is a cross-sectional view of the vibration-shock energy absorption device using the composite tube according to the present invention, FIG. 3B is an exploded perspective view of the vibration-shock energy absorption device using the composite tube according to the present invention, FIGS. 4A to 4F are views illustrating a configuration in which a compressive shock is absorbed by some components of the vibration-shock energy absorption device using the composite tube according to the present invention, and FIGS. 5A to 5D are views illustrating a configuration in which a tensile shock is absorbed by some components of the vibration-shock energy absorption device using the composite tube according to the present invention.

The vibration-shock energy absorption device according to the present invention refers to a device that absorbs vibration-shock energy, which is applied to two end connecting units each formed in the form of a rod end bearing, by means of compression and fracture of composite tubes mounted inside and outside the device.

FIG. 3A is a cross-sectional view illustrating detailed components of the vibration-shock energy absorption device according to the present invention (hereinafter, referred to as the 'vibration-shock absorption device'), and FIG. 3B is an exploded perspective view of the vibration-shock absorption device. First, the device according to the present invention has an inner cylinder 10 and an outer cylinder 20 which are configured such that a cylindrical portion of the inner cylinder 10 and a cylindrical portion of the outer cylinder 20 overlap each other, and composite tubes and springs are provided between the inner cylinder 10 and the outer cylinder 20. For ease of description, a configuration for absorbing compressive shock energy and a configuration for absorbing tensile shock energy will be separately described.

[Constituent Elements for Absorbing Compressive Shock Energy (See FIGS. 4A to 4F)]

The inner cylinder 10 has a cylindrical first member 12 having therein a hollow portion, the outer cylinder 20 also has a cylindrical second member 22 having therein a hollow portion, the first member 12 of the inner cylinder is coupled by being inserted into the second member 22 of the outer cylinder 20, and the inner cylinder may be moved in a longitudinal direction relative to the outer cylinder in a state in which the inner cylinder is inserted into the outer cylinder.

A first support end 15 configured to support a first composite tube 100 is provided on an outer circumferential surface of the inner cylinder, and a second support end 25 configured to support an outer spring 35 is provided on an outer circumferential surface of the outer cylinder. Further, compressive sliders 30 and compressive wedges 32 are provided on the outer circumferential surface of the second member 22 of the outer cylinder. About four compressive wedges and about four compressive sliders are provided along the outer circumferential surface of the second member. Slider inclined surfaces 30a are formed inside the compressive slider 30, wedge inclined surfaces 32a are formed outside the compressive wedge 32, and the compressive slider 30 is coupled to an outer portion of the compressive wedge 32 such that the slider inclined surfaces 30a and the wedge inclined surfaces 32a adjoin one another. Here, the terms "inside (inner)" and "outside (outer)" refer to a direction toward the inside and a direction toward the outside, respectively, based on a radial direction of the first and second members (a radial direction perpendicular to the longitudinal direction).

Further, the compressive slider 30 and the compressive wedge 32 are coupled in a shape in which the plurality of slider inclined surfaces 30a and the plurality of wedge inclined surfaces 32a are repeated. Leaf springs 33 are interposed between the plurality of slider inclined surfaces 30a and the plurality of wedge inclined surfaces 32a to apply elastic force, such that the slider inclined surfaces 30a and the wedge inclined surfaces 32a adjoin one another.

Further, the first composite tube 100 is positioned between one side surface 30b of the compressive slider 30 and the first support end 15 of the inner cylinder 10, and the outer spring 35 is positioned between the other side surface 30c of the compressive slider 30 and the second support end 25 of the outer cylinder 20. The outer spring 35 presses the compressive slider 30 toward the first composite tube.

[Constituent Elements for Absorbing Tensile Shock Energy (See FIGS. 5A to 5D)]

Referring to FIG. 3A, an end plug 70 is disposed to be inserted into the hollow portion of the outer cylinder 20. The end plug 70 may be moved relative to the outer cylinder 20 in a direction in which a length of the vibration-shock absorption device is increased. However, a projection is formed at a predetermined position of the end plug, and the projection prevents the relative movement of the end plug in a direction in which the length of the vibration-shock absorption device is decreased.

A center pin 75 extends at a center of the end plug 70 and is disposed inside the first member 12 of the inner cylinder. A protruding end 78 configured to support a second composite tube 200 (to be described below) is disposed at an end of the end plug 70 and formed in a radial direction of the center pin.

Further, tensile sliders 80 and tensile wedges 82 are provided on an inner circumferential surface of the first member 12 of the inner cylinder. About four tensile wedges and about four tensile sliders are provided along the inner circumferential surface of the first member. Slider inclined surfaces 80a are formed outside the tensile slider 80, wedge inclined surfaces 82a are formed inside the tensile wedge 82, and the tensile slider 80 is coupled to an inner portion of the tensile wedge 82 such that the slider inclined surfaces 80a and the wedge inclined surfaces 82a adjoin one another. Further, the tensile slider 80 and the tensile wedge 82 are coupled in a shape in which the plurality of slider inclined surfaces 80a and the plurality of wedge inclined surfaces 82a are repeated. Leaf springs (not illustrated) are interposed between the plurality of slider inclined surfaces 80a and the plurality of wedge inclined surfaces 82a to apply elastic force, such that the slider inclined surfaces 80a and the wedge inclined surfaces 82a adjoin one another.

A spring support end 72 configured to support an inner spring 90 is provided inside the end plug, and the inner spring is disposed between the spring support end 72 and the tensile slider 80. Further, the second composite tube 200 is positioned between one side surface 80b of the tensile slider 80 and the protruding end 78 of the center pin 75. The inner spring 90 positioned between the other side surface 80c of the tensile slider 80 and the spring support end 72 presses the tensile slider 80 toward the second composite tube.

A vibration-shock energy absorption principle of the device will be described with reference to the drawings. A principle of absorbing compressive shock energy will be described first, and then a principle of absorbing tensile shock energy will be described.

[Principle of Absorbing Compressive Shock Energy (in Case of Application of Compressive Shock Load)]

When a compressive shock load occurs between the inner cylinder 10 and the outer cylinder 20 (or the end plug 70), the compressive load is applied to the compressive slider 30, and the compressive load is applied to the first composite tube 100, such that the shock is absorbed as a part of the first composite tube is fractured. This shock absorption is made by the functions of the compressive slider 30 and the compressive wedge 32 which are provided on the outer circumferential surface of the second member 22 of the outer cylinder.

The slider inclined surfaces 30a are formed inside the compressive slider 30, the wedge inclined surfaces 32a are formed outside the compressive wedge 32, and the compressive slider 30 is coupled to the outer portion of the compressive wedge 32 such that the slider inclined surfaces 30a and the wedge inclined surfaces 32a adjoin one another.

Figure 4A:
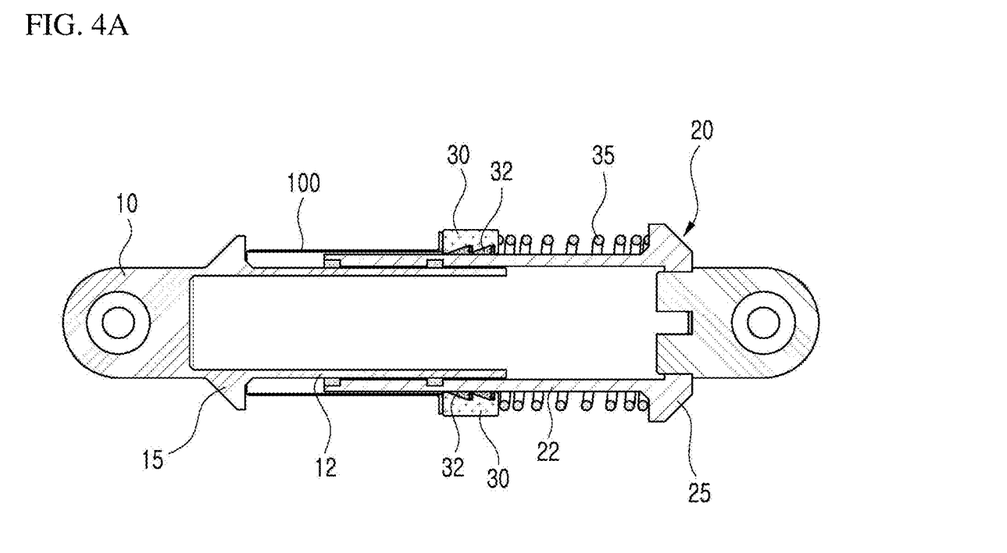
FIGS. 4A to 4F are views illustrating a configuration in which a compressive shock is absorbed by some components of the vibration-shock energy absorption device using the composite tube according to the present invention.
Figure 4B:
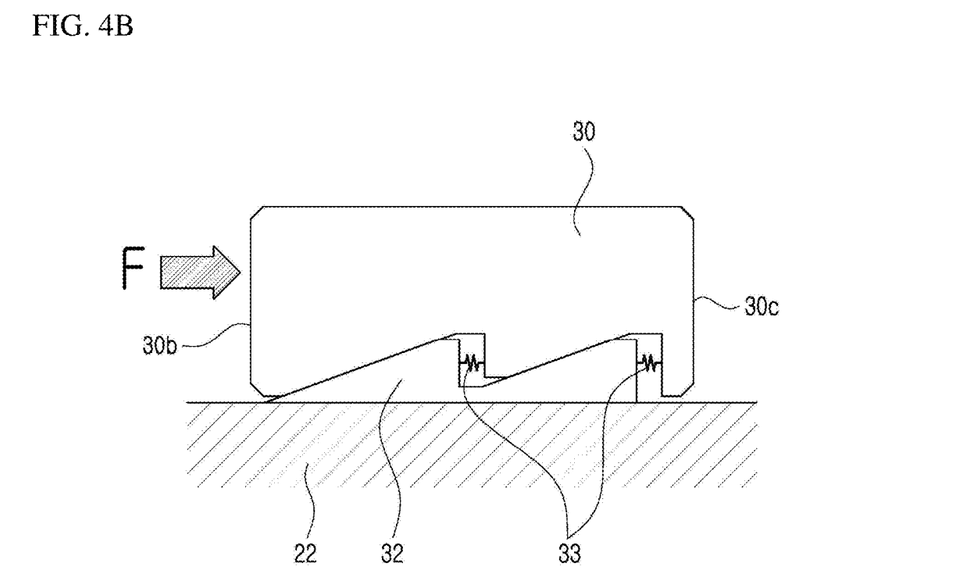
Figure 4C:
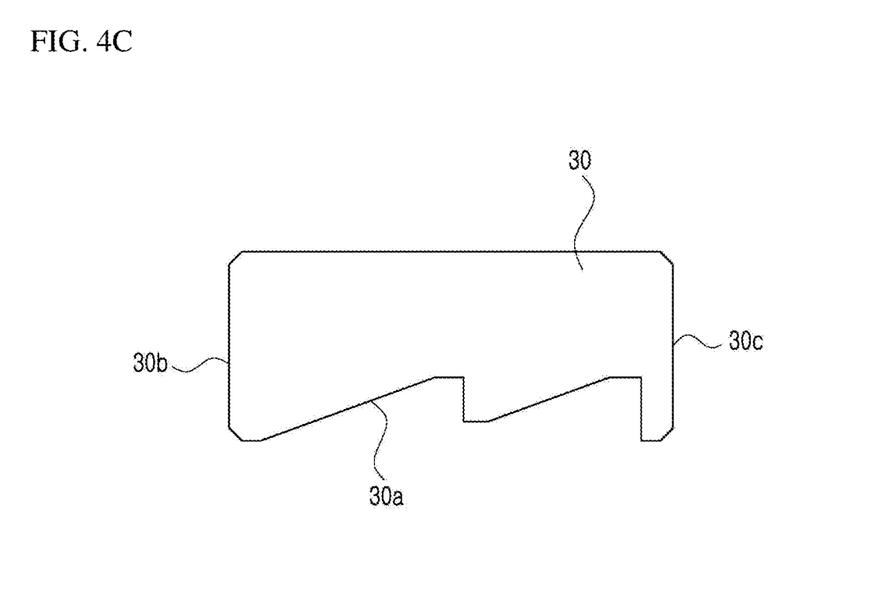
Figure 4D:
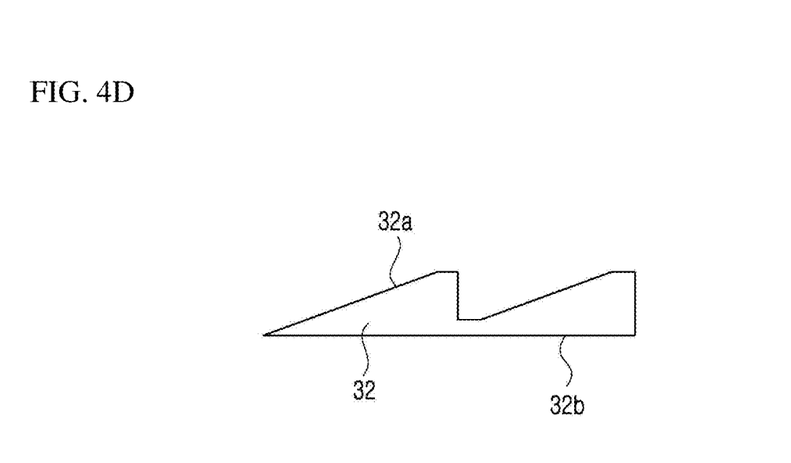
Figure 4E:
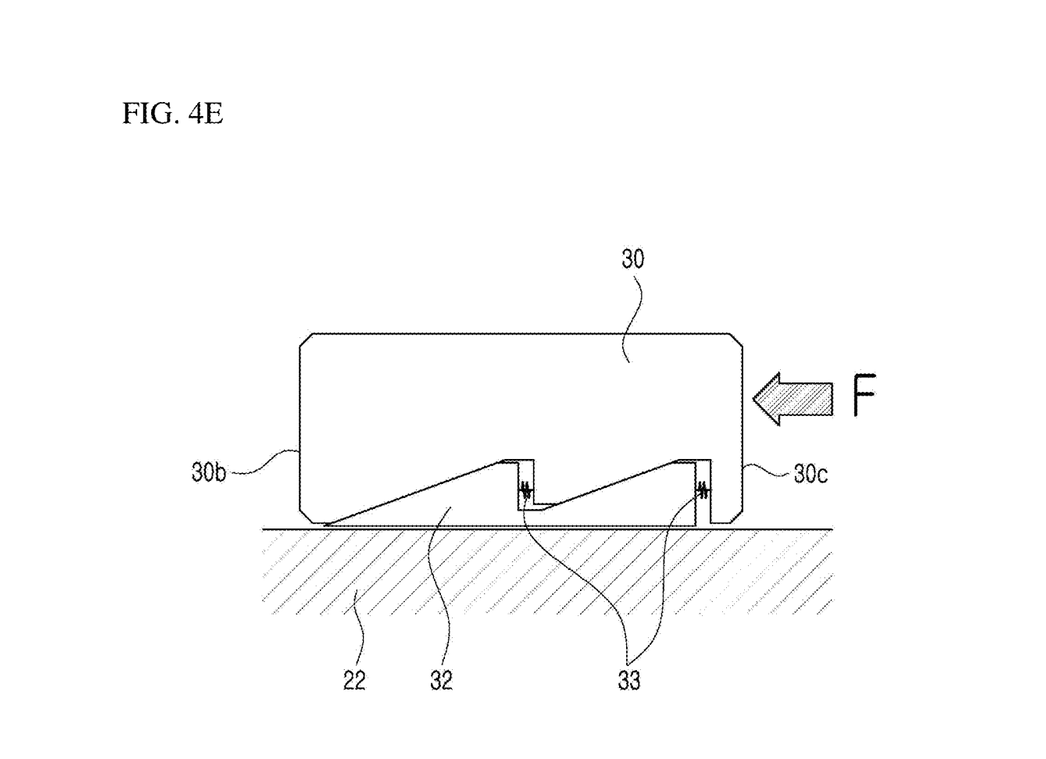
Figure 4F:
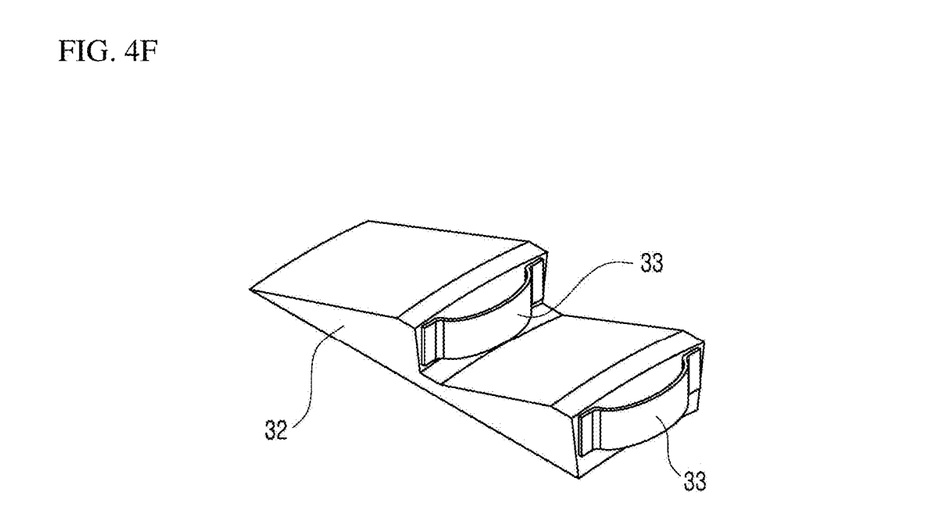
Figure 5A:
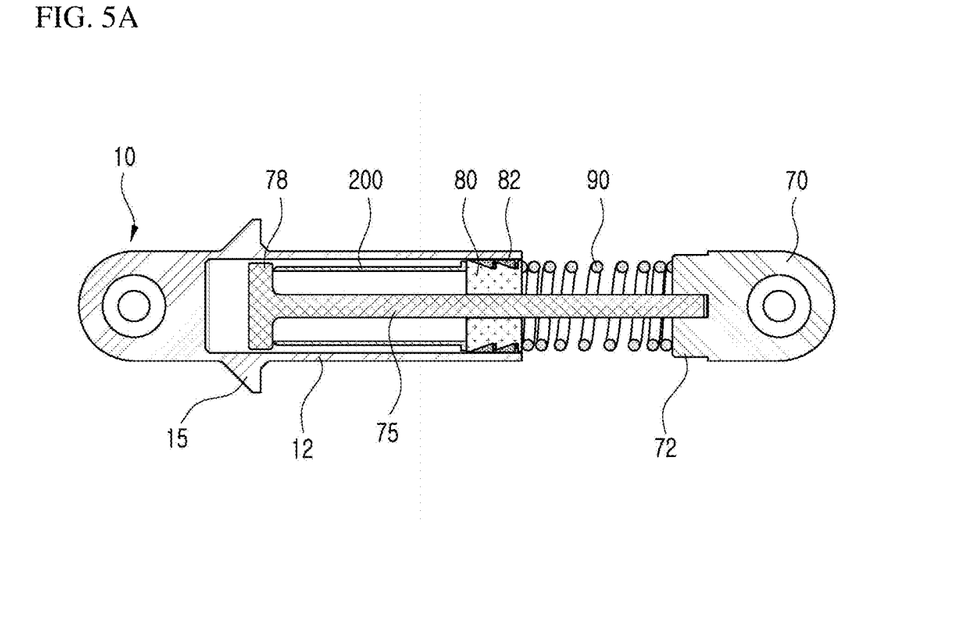
Figure 5B:
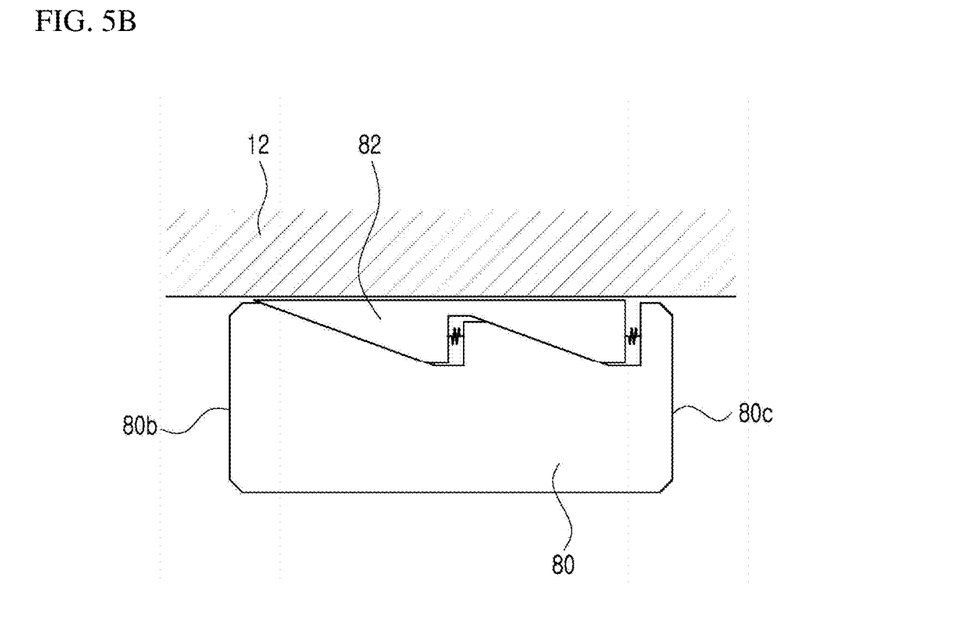
Figure 5C:
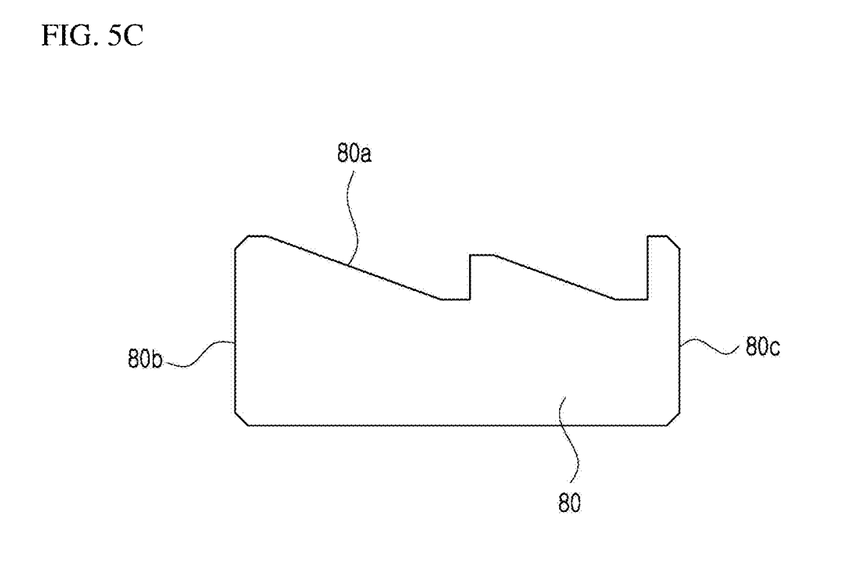
Figure 5D:
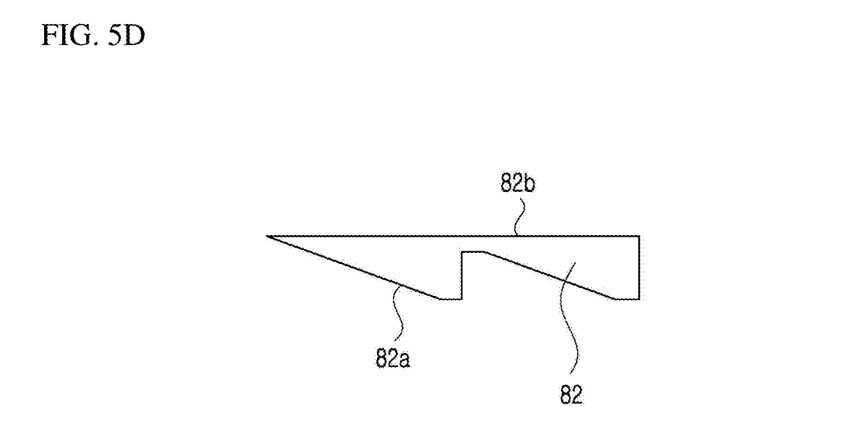

When the compressive load occurs in this state, a force is applied to one side surface 30b of the compressive slider 30 in a direction of F indicated in FIG. 4B. Then, the slider inclined surface 30a of the compressive slider 30 forms a component of force perpendicular to the wedge inclined surface 32a of the compressive wedge 32 (a component of force perpendicular to the force F). A frictional force between an inner circumferential surface 32b of the compressive wedge 32 and the outer circumferential surface of the second member 22 of the outer cylinder is increased by the perpendicular component of force, such that the compressive wedge 32 and the outer cylinder are tightly attached to each other and integrally moved. That is, the compressive slider 30, the compressive wedge 32, and the outer cylinder 20 are simultaneously moved (see FIG. 4B).

As a result, a part of the first composite tube 100 positioned between the compressive slider 30 and the first support end 15 of the inner cylinder is fractured by receiving the compressive force, such that the shock energy is absorbed during the fracture. Further, since the energy is absorbed as a part of the first composite tube is fractured, the compressive slider 30 may move toward the first composite tube by receiving elastic force of the outer spring 35 by the fractured length of the first composite tube 100. In this case, the elastic force (F in FIG. 4E) generated by the outer spring 35 is applied to the other side surface 30c of the compressive slider 30. In this case, because the inner circumferential surface 32b of the compressive wedge 32 and the outer circumferential surface of the second member 22 of the outer cylinder are separated from each other without being tightly attached to each other, there is no frictional force applied between the inner circumferential surface 32b of the compressive wedge 32 and the outer circumferential surface of the second member 22 of the outer cylinder. Therefore, the compressive slider 30 may be moved relative to the outer circumferential surface of the second member 22 by the elastic force of the outer spring. The compressive slider 30 moves a predetermined distance toward the first composite tube (by the fractured length of the first composite tube).

Further, this state is prepared against a secondary compressive shock load, and when the secondary shock load occurs, the same process is performed and the first composite tube is gradually fractured, thereby absorbing the shock energy.

[Principle of Absorbing Tensile Shock Energy (in Case of Application of Tensile Shock Load)]

When a tensile shock occurs between the inner cylinder 10 and the outer cylinder 20, a movement in a direction opposite to the direction of the compression movement is performed. The tensile shock energy means the principle in which a part of the second composite tube 200 is fractured by the tensile slider 80 and the tensile wedge 82 to be described below. This principle is similar to the above-mentioned principle in which the compressive shock load is absorbed.

When the tensile shock load occurs between the inner cylinder 10 and the end plug 70, the slider inclined surface 80a of the tensile slider 80 forms a component of force perpendicular to the wedge inclined surface 82a of the tensile wedge 82. A frictional force between an inner circumferential surface 82b of the tensile wedge 82 and the inner circumferential surface of the first member 12 of the inner cylinder 10 is increased by the perpendicular component of force, such that the tensile wedge 82 and the inner cylinder 10 are tightly attached to each other and integrally moved. That is, the tensile slider 80, the tensile wedge 82, and the inner cylinder 10 are simultaneously moved.

As a result, a part of the second composite tube 200 positioned between the tensile slider 80 and the protruding end 78 of the center pin 75 is fractured by receiving the compressive force, such that the shock energy is absorbed during the fracture. Further, since the energy is absorbed as a part of the second composite tube is fractured, the tensile slider 80 may move toward the second composite tube by receiving elastic force of the inner spring 90 by the fractured length of the second composite tube. In this case, because the inner circumferential surface 82b of the tensile wedge and the inner circumferential surface of the first member 12 of the inner cylinder are separated from each other without being tightly attached to each other, there is no frictional force applied between the inner circumferential surface 82b of the tensile wedge and the inner circumferential surface of the first member 12 of the inner cylinder. Therefore, the tensile slider 80 may be moved relative to the inner circumferential surface of the first member 12. The tensile slider 80 moves a predetermined distance toward the second composite tube (by the fractured length of the second composite tube).

Further, this state is prepared against a secondary tensile shock load, and when the secondary shock load occurs, the same process is performed and the second composite tube is gradually fractured, thereby absorbing the shock energy.

With the above-mentioned processes, the energy absorption device according to the present invention may continuously absorb the compressive and tensile shocks that occur several times. In particular, the energy absorption device is highly utilized as a building vibration control device that prepares for earthquakes with repeated compressive and tensile loads.

Figure 6A:
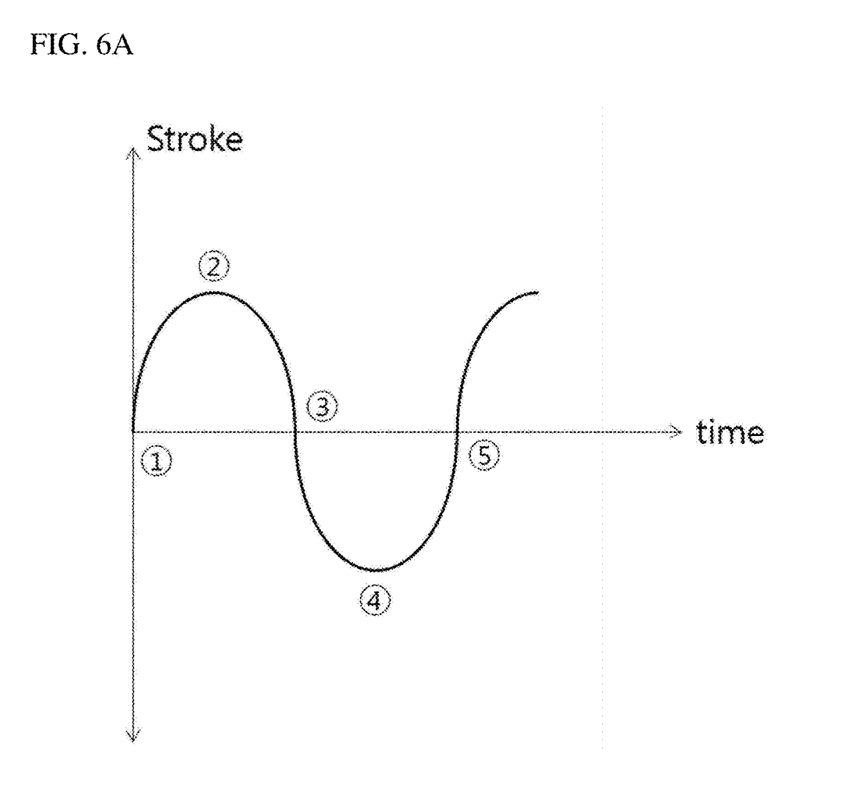
FIG. 6A is a graph illustrating a state in which compressive shock loads and tensile shock loads are repeated.
Figure 6B:
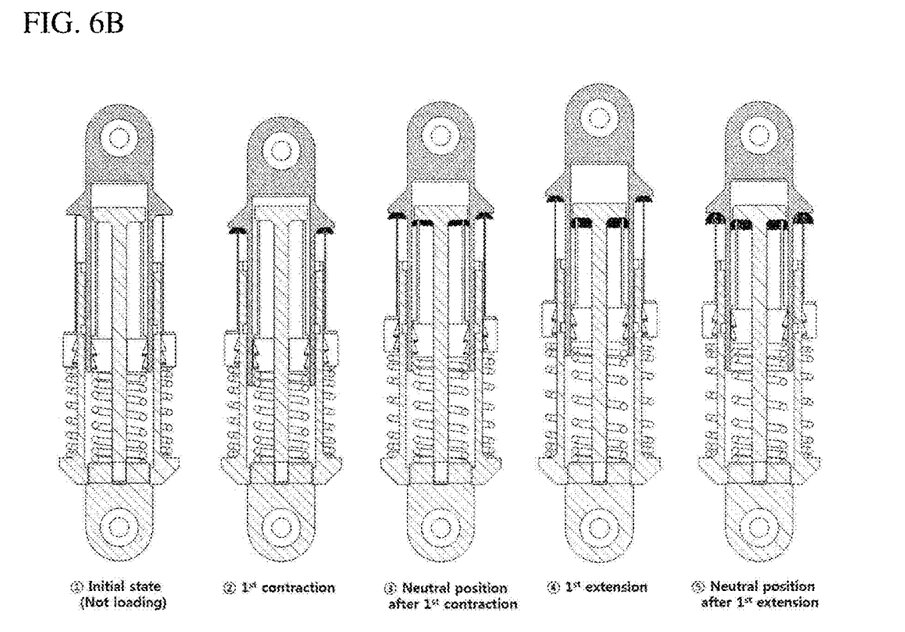
FIG. 6B is a view illustrating a process in which a part of the composite tube according to the present invention is fractured by the shock in FIG. 6A.

FIG. 6A is a graph illustrating a state in which the compressive shock loads and the tensile shock loads are repeated, FIG. 6B is a view illustrating a process in which a part of the composite tube according to the present invention is fractured by the shock in FIG. 6A.

In FIG. 6A, ① indicates an initial state in which no load is applied. ② indicates a state in which a first compressive shock load is applied, ③ indicates a state in which the position returns to the neutral position after the first compressive load is applied, ④ indicates a state in which a first tensile shock load is applied, and ⑤ indicates a state in which the position returns to the neutral position after the first tensile load is applied.

Further, FIG. 6B illustrates the movement of the shock energy absorption device according to the present invention in the states illustrated in FIG. 6A.

In FIG. 6B, ② indicates a state in which the compressive shock is absorbed as an upper end x of the first composite tube is primarily fractured in a state in which the first compressive shock load is applied. ③ indicates a state in which the tensile shock is absorbed as an upper end y of the second composite tube is primarily fractured due to the tensile shock load applied during the process in which the position returns to the neutral position after the first compressive load is applied. ④ indicates a state in which the degree of the fracture of the upper end y of the second composite tube is further increased due to the tensile shock that continuously occurs as the first tensile load is applied and the position passes the neutral point. ⑤ indicates a state in which the degree of the fracture of the upper end x of the first composite tube is further increased due to the compressive load that occurs during the process in which the position returns to the neutral position after the first tensile load is applied.

According to the present invention, the shock energy is gradually absorbed as the first composite tube and the second composite tube are continuously and partially fractured during the process in which the compressive and tensile loads are repeated.

Figure 7:
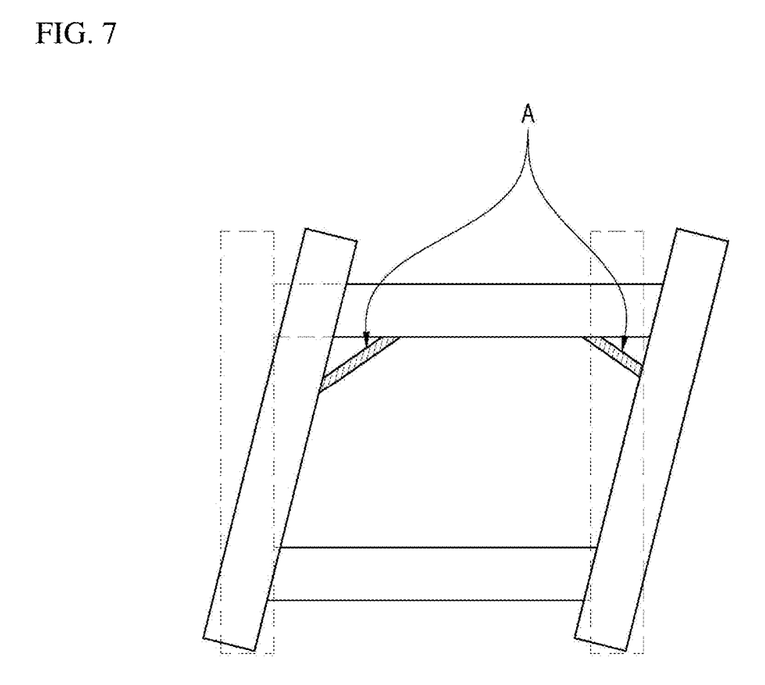
FIG. 7 is a view illustrating an example in which the vibration-shock energy absorption device using the composite tube according to the present invention is used as a building vibration control device.

FIG. 7 is a view illustrating an example in which the vibration-shock energy absorption device using the composite tube according to the present invention is used as a building vibration control device, in which the part indicated by A is the energy absorption device according to the present invention, and the energy absorption devices are installed at corners between building frames.

The invention claimed is:

1. A vibration-shock energy absorption device using a composite tube, the vibration-shock energy absorption device comprising:
   an inner cylinder having a cylindrical first member having therein a hollow portion;
   an outer cylinder having a second member having therein a hollow portion configured to accommodate the first member;
   a compressive wedge provided to adjoin an outer circumferential surface of the second member of the outer cylinder;
   a compressive slider provided to be in contact with an outer surface of the compressive wedge; and
   a first composite tube and an outer spring configured to adjoin one side surface and an opposite side surface of the compressive slider, respectively,
   wherein a slider inclined surface is formed inside the compressive slider, and a wedge inclined surface is formed outside the compressive wedge, such that the slider inclined surface and the wedge inclined surface adjoin each other.

2. The vibration-shock energy absorption device of claim 1, further comprising:
   a first support end protruding outward from the inner cylinder and configured to support the first composite tube; and
   a second support end protruding outward from the outer cylinder and configured to support the outer spring.

3. The vibration-shock energy absorption device of claim 1, wherein the wedge inclined surface of the compressive wedge is formed such that a thickness of the compressive wedge is increased in a direction from the inner cylinder to the outer cylinder.

4. The vibration-shock energy absorption device of claim 3, wherein when a compressive shock load occurs between the inner cylinder and the outer cylinder, the slider inclined surface of the compressive slider applies a perpendicular force to the wedge inclined surface of the compressive wedge, such that an inner circumferential surface of the compressive wedge and the outer circumferential surface of the second member of the outer cylinder are tightly attached to each other, and the compressive wedge and the outer cylinder are integrally moved.

5. The vibration-shock energy absorption device of claim 4, wherein only a part of the first composite tube in a longitudinal direction is fractured to absorb shock energy.

6. The vibration-shock energy absorption device of claim 3, wherein when a compressive shock load between the inner cylinder and the outer cylinder is eliminated, an inner circumferential surface of the compressive wedge and the outer circumferential surface of the second member of the outer cylinder are separated from each other, such that the compressive wedge and the outer cylinder are movable relative to each other.

7. A vibration-shock energy absorption device using a composite tube, the vibration-shock energy absorption device comprising:
   an inner cylinder having a cylindrical first member having therein a hollow portion;
   an end plug having a center pin disposed in the hollow portion in the first member of the inner cylinder;
   a tensile wedge provided to adjoin an inner circumferential surface of the first member of the inner cylinder;
   a tensile slider provided to be in contact with an inner surface of the tensile wedge; and
   a composite tube and an inner spring configured to adjoin one side surface and an opposite side surface of the tensile slider, respectively,
   wherein a slider inclined surface is formed outside the tensile slider, and a wedge inclined surface is formed inside the tensile wedge, such that the slider inclined surface and the wedge inclined surface adjoin each other.

8. The vibration-shock energy absorption device of claim 7, further comprising:
   a protruding end protruding outward from an end of the center pin and configured to support the second composite tube; and
   a spring support end formed on the end plug and configured to support the inner spring.

9. The vibration-shock energy absorption device of claim 7, wherein the wedge inclined surface of the tensile wedge is formed such that a thickness of the tensile wedge is increased in a direction from the inner cylinder to the end plug.

10. The vibration-shock energy absorption device of claim 9, wherein when a tensile shock load occurs between the inner cylinder and the end plug, the slider inclined surface of the tensile slider applies a perpendicular force to the wedge inclined surface of the tensile wedge, such that an outer circumferential surface of the tensile wedge and the inner circumferential surface of the first member of the inner cylinder are tightly attached to each other, and the tensile wedge and the inner cylinder are integrally moved.

11. The vibration-shock energy absorption device of claim 10, wherein only a part of the composite tube in a longitudinal direction is fractured to absorb shock energy.

12. The vibration-shock energy absorption device of claim 9, wherein when a tensile shock load between the inner cylinder and the end plug is eliminated, an outer circumferential surface of the tensile wedge and the inner circumferential surface of the first member of the inner cylinder are separated from each other, such that the tensile wedge and the inner cylinder are movable relative to each other.

13. A vibration-shock energy absorption device using a composite tube, the vibration-shock energy absorption device comprising:
- an inner cylinder having a cylindrical first member having therein a hollow portion;
- an outer cylinder having a second member having therein a hollow portion configured to accommodate the first member;
- an end plug having a center pin that penetrates the hollow portion in the second member and has an end disposed in the hollow portion in the first member;
- a compressive wedge provided to adjoin an outer circumferential surface of the second member of the outer cylinder;
- a compressive slider provided to be in contact with an outer surface of the compressive wedge;
- a first composite tube and an outer spring configured to adjoin one side surface and an opposite side surface of the compressive slider, respectively;
- a tensile wedge provided to adjoin an inner circumferential surface of the first member of the inner cylinder;
- a tensile slider provided to be in contact with an inner surface of the compressive wedge; and
- a second composite tube and an inner spring configured to adjoin one side surface and an opposite side surface of the tensile slider, respectively.

14. The vibration-shock energy absorption device of claim 13, wherein a slider inclined surface is formed inside the compressive slider and a wedge inclined surface is formed outside the compressive wedge such that the slider inclined surface and the wedge inclined surface adjoin each other, and a slider inclined surface is formed outside the tensile slider and a wedge inclined surface is formed inside the tensile wedge such that the slider inclined surface and the wedge inclined surface adjoin each other.

15. The vibration-shock energy absorption device of claim 14, wherein when a compressive shock load occurs, the slider inclined surface of the compressive slider applies a perpendicular force to the wedge inclined surface of the compressive wedge such that an inner circumferential surface of the compressive wedge and the outer circumferential surface of the second member of the outer cylinder are tightly attached to each other and the compressive wedge and the outer cylinder are integrally moved, and when a tensile shock load occurs, the slider inclined surface of the tensile slider applies a perpendicular force to the wedge inclined surface of the tensile wedge such that an outer circumferential surface of the tensile wedge and the inner circumferential surface of the first member of the inner cylinder are tightly attached to each other and the tensile wedge and the inner cylinder are integrally moved.

16. A building vibration control device comprising the vibration-shock energy absorption device using the composite tube according to claim 1.

17. A building vibration control device comprising the vibration-shock energy absorption device using the composite tube according to claim 7.

18. A building vibration control device comprising the vibration-shock energy absorption device using the composite tube according to claim 13.

* * * * *